March 12, 1935.    R. A. MILLER    1,993,795
SOUND RECORDING SYSTEM
Filed Sept. 15, 1932
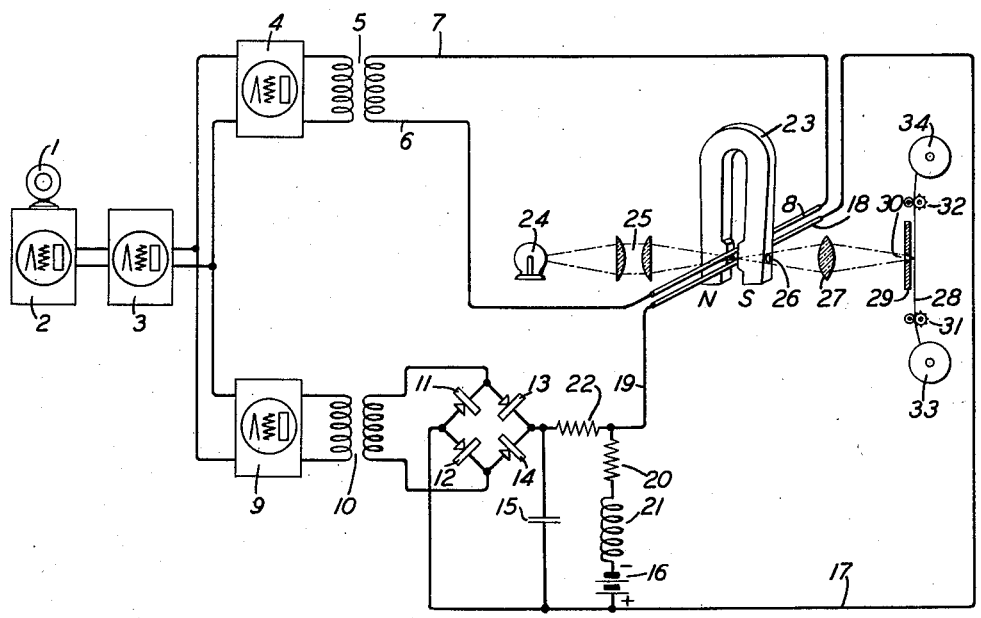
INVENTOR
R. A. MILLER
BY
G. H. Heydt.
ATTORNEY Patented Mar. 12, 1935

1,993,795

UNITED STATES PATENT OFFICE 1,993,795

SOUND RECORDING SYSTEM

Robert A. Miller, Plainfield, N. J., assignor to Bell Telephone Laboratories, Incorporated, New York, N. Y., a corporation of New York Application September 15, 1932, Serial No. 633,264

6 Claims. (Cl. 179—100.3)

This invention relates to film sound recording systems, particularly systems which produce records of the constant width, variable density type.

The object of the invention is a system which varies the instantaneous time of exposure of the sensitive material in accordance with the instantaneous variations in the amplitude of the signal modulated currents, and simultaneously varies the mean time of exposure of the sensitive material in accordance with the envelope of the amplitude variations in the signal modulated currents.

A feature of the invention resides in the use of electrically independent control means cooperatively controlling the time of exposure of the sensitive material.

Another feature of the invention is a light valve comprising two electrically independent control shutters cooperatively controlling the time of exposure.

A further feature of the invention is a light valve in which the electrically independent control means take the form of a pair of parallel conductive ribbons immersed in a common magnetic field.

Recent experiments have shown that the noise currents produced during the reproduction of a positive copy of a negative film record will be reduced in absolute magnitude if the mean time of the exposure of the negative film record during recording is as small as possible. The small time of exposure impressed on the negative film record will produce a record having a small photographic deposit. A positive copy printed from such a record will have a heavy photographic deposit, that is, the positive copy will be as dark as possible.

The mean time of exposure impressed at any instant must be sufficiently large to permit full modulation of the exposure by the instantaneous value of the amplitude of the modulated currents at that instant or a distortion of the recorded amplitudes will be produced.

In accordance with the present invention, the mean time of exposure is controlled by a light valve actuated independently of any other control exercised on the recording beam of light. A movable shutter which may be termed the control shutter placed laterally of the film defines the extent of the exposure lengthwise of the film, that is, for a film moving at uniform speed, the mean time of exposure. A unidirectional current, which may be termed a "static bias" controls the position of this shutter. When no modulated currents are applied to the recording channel, the static bias is adjusted to produce a very small time of exposure. A portion of the modulated currents are amplified, rectified and filtered to produce a current which varies with the envelope of the amplitude variations of the modulated currents. This filtered current, which may be termed a "dynamic bias" is applied to the control circuit in such manner as to oppose the effect of the static bias on the movable shutter.

An electrically independent shutter, which may be termed the modulating shutter, cooperates with the control shutter in defining the extent of the exposure lengthwise of the film. The modulating shutter is actuated by and in accordance with the instantaneous variations in the modulated currents. The control shutter thus moves just sufficiently to permit the modulating shutter to move through an oscillation proportional to the amplitude of the modulated currents and the mean exposure is thus at all times as small as possible.

The drawing diagrammatically represents a preferred embodiment of the invention.

Acoustic waves are detected by a known type of microphone 1 and the modulated currents are amplified, as desired, in amplifiers 2 and 3. A portion of the amplified modulated currents are further amplified in an amplifier 4 and applied through transformer 5 and wires 6 and 7 to one ribbon 8 of a light valve, causing the ribbon 8 to vibrate in accordance with the modulated currents. The ribbon 8 may conveniently be termed a modulating shutter or ribbon.

Another portion of the amplified modulated currents are further amplified in an amplifier 9 and applied through a transformer 10 to a rectifier, which may comprise the bridge-connected elements 11, 12, 13 and 14. Elements 11, 12, 13 and 14 may be copper-copper oxide rectifying couples. Any other suitable rectifier may replace the rectifier shown. The rectified modulated currents will tend to charge the capacitor 15.

Current from a battery 16 or other source of steady current, flows through wire 17, to another ribbon 18 of a light valve, thence through wire 19, resistor 20, inductor 21 back to the battery 16. In the absence of rectified modulated currents from the rectifiers 11, 12, 13 and 14, the ribbon 18 will be displaced to a maximum degree by the current from battery 16. When rectified, modulated currents are first supplied by the rectifiers 11, 12, 13 and 14, the currents will charge the capacitor 15. As the charge on the capacitor 15 increases, a portion of the charge will leak away through resistor 22 and oppose the effect of the current from battery 16 on the ribbon 18. When the rectified modulated currents are of maximum amplitude, the effect of the current from battery 16 on the ribbon 18 may be completely nullified or even reversed. When the rectified modulated currents cease to be supplied by the rectifiers 11, 12, 13 and 14, the capacitor 15 gradually discharges and the ribbon 18 is then controlled only by the current from the battery 16. Due to the interaction of these elements, the ribbon 18 does not vibrate at the frequency of the acoustic waves, but at a slower frequency which may, if desired, correspond to the envelope of the amplitude variations of the acoustic waves. The ribbon 18 may thus be termed a control shutter or ribbon.

The ribbons 8 and 18 are immersed in a steady magnetic field due to a magnet 23. Light from a suitable source 24 is directed by the lens system 25 through orifices 26 pierced in the pole pieces of the magnet 23, and is then focused by the lens 27 on a sensitive film 28. An opaque plate 29 pierced by a suitable aperture 30 defines the exposed area of the film. The film 28 is moved in the usual manner by sprockets 31, 32 from reel 33 to reel 34 (or vice versa).

The ribbons 8 and 18 are mechanically adjusted to define a light transmitting slot, which is generally of the order of one or two thousands of an inch in height. In the absence of modulated currents, the current from the battery 16 is adjusted, for example, by varying the resistor 20, till the ribbon 18 is displaced upward and nearly closes the light transmitting slot. When modulated waves are applied to the recording channel, the ribbon 8 is oscillated in accordance with the modulated waves, while the ribbon 18 is simultaneously displaced downward sufficiently to permit the ribbon 8 to oscillate without clashing or striking the ribbon 18.

What is claimed is:

1. In combination, a source of light, a photographic film moved at constant speed through light from said source, a source of modulated currents, a modulating shutter actuated by modulated currents from said source interposed between said source of light and said film, said shutter vibrating in the direction of motion of said film, a control shutter interposed between said source of light and said film and vibrating in the direction of motion of said film, a source of unidirectional current, a circuit for controlling the position of said control shutter by current from said source of unidirectional current and a control circuit comprising a rectifier and a filter energized by modulated currents from said source and producing a current varying with the envelope of the amplitude variations of said modulated currents and opposing the effect of said unidirectional current on said control shutter.

2. In combination, a source of light, a photographic film moved at constant speed and exposed to said light, a source of modulated currents, a modulating shutter actuated by modulated currents from said source, a control shutter, said modulating shutter and said control shutter cooperatively controlling the light impressed on said film and vibrating in the direction of motion of said film, a source of unidirectional current, a circuit for controlling the position of rest of said control shutter by current from said source of unidirectional current and a control circuit comprising a rectifier and a filter energized by modulated currents from said source and producing a current varying with the envelope of the amplitude variations of said modulated currents and opposing the effect of said unidirectional current on said control shutter.

3. In combination, a source of light, a photographic film moved through light from said source, a source of modulated currents, a control shutter interposed between said source of light and said film, a control circuit energized by modulated currents from said source to move said control shutter longitudinally of said film at a frequency less than the frequency of said modulated currents, and a modulating shutter interposed between said source of light and said film and vibrated longitudinally of said film by and in accordance with modulated currents from said source said control shutter and said modulating shutter being in the same plane parallel to the film and cooperatively defining the size of the beam from said source impressed on the film.

4. In combination, a source of light, a photographic film moved at constant speed through light from said source, a light valve interposed between said source and said film and having a modulating shutter and a control shutter vibrating in the direction of motion of said film, a source of signal currents, a circuit for actuating said modulating shutter by signal currents from said source, a control circuit comprising a rectifier and filter energized by signal currents from said source and a circuit for applying said rectified currents to control the position of said control shutter.

5. In combination, a source of light, a photographic film moved at constant speed through light from said source, a light valve interposed between said source and said film and having a modulating shutter and a control shutter vibrating in the same plane, a source of signal currents, a circuit for actuating said modulating shutter by signal currents from said source, a control circuit comprising a rectifier and filter energized by signal currents and a circuit for applying said rectified currents to control the position of said control shutter.

6. In combination, a beam of light, a photographic film moved at constant speed through said beam, a light valve having a pair of stretched conducting ribbons defining said beam and immersed in a constant magnetic field, a circuit for actuating one of said ribbons by signal currents, a circuit for controlling the position of rest of the other ribbon with unidirectional current, and a control circuit comprising a rectifier and filter energized by signal currents and opposing the effect of said unidirectional current on said other ribbon.

ROBERT A. MILLER.